(12) United States Patent
Tiefenbrunn et al.

(10) Patent No.: US 11,829,055 B2
(45) Date of Patent: Nov. 28, 2023

(54) CLAMPING MECHANISM

(71) Applicants: Larry J. Tiefenbrunn, East Brunswick, NJ (US); Merin Swasey, North Logan, UT (US)

(72) Inventors: Larry J. Tiefenbrunn, East Brunswick, NJ (US); Merin Swasey, North Logan, UT (US)

(73) Assignee: Larry J. Tiefenbrunn, East Brunswick, NJ (US)

( * ) Notice: Subject to any disclaimer, the term of this patent is extended or adjusted under 35 U.S.C. 154(b) by 531 days.

(21) Appl. No.: 17/140,074

(22) Filed: Jan. 3, 2021

(65) Prior Publication Data

US 2022/0214601 A1 Jul. 7, 2022

Related U.S. Application Data

(60) Provisional application No. 63/025,122, filed on May 14, 2020.

(51) Int. Cl.

| | |
|---|---|
| *G03B 17/56* | (2021.01) |
| *F16M 13/02* | (2006.01) |
| *F16M 11/08* | (2006.01) |
| *F16C 11/06* | (2006.01) |
| *F16M 11/20* | (2006.01) |

(52) U.S. Cl.
CPC ........ *G03B 17/561* (2013.01); *F16C 11/0623* (2013.01); *F16M 11/08* (2013.01); *F16M 11/2078* (2013.01); *F16M 13/022* (2013.01); *F16M 2200/024* (2013.01)

(58) Field of Classification Search
CPC .... G03B 17/56; G03B 17/561; G03B 17/566; F16C 11/06; F16C 11/0619; F16C 11/0623; F16C 11/0695; F16C 11/10; F16C 11/103; F16C 11/106; F16M 11/08; F16M 11/14; F16M 11/16; F16M 11/18; F16M 11/2007; F16M 11/2078; F16M 13/022; F16M 2200/022; F16M 2200/024
See application file for complete search history.

(56) References Cited

U.S. PATENT DOCUMENTS 7,111,836 B1 * 9/2006 West ..................... F16C 11/106
269/75

* cited by examiner

*Primary Examiner* — Clayton E. LaBalle
*Assistant Examiner* — Fang-Chi Chang
(74) *Attorney, Agent, or Firm* — Henry E. Schanzer

(57) ABSTRACT

A clamping mechanism embodying the invention may be disposed between a swivel ball and a housing overlying the ball for selectively locking or unlocking the swivel ball relative to the housing. The clamping mechanism includes first and second gears mounted on a compression screw with rotational forces being selectively applied to the first and second gears via respective first and second gear-pawl assemblies. The rotational forces cause vertical (up/down) motion along the screw which increases or decreases the pressure exerted between the housing and the swivel ball which effectively may be used to lock (clamp) or unlock (unclamp) the swivel ball relative to the housing.

17 Claims, 12 Drawing Sheets

CLAMPING MECHANISM

This invention claims priority based on a U.S. provisional application Ser. No. 63/025,122 filed May 14, 2020 titled Clamping Mechanism whose teachings are incorporated herein by reference.

BACKGROUND OF THE INVENTION

This invention relates to an improved clamping (locking) mechanism assembly suitable, and, by way of example, is shown to be applicable in a camera swivel ball head mount control system.

BRIEF SUMMARY OF THE INVENTION

In an embodiment of the invention, a clamping mechanism is coupled between a swivel ball and a housing to control their relative movement. Clamping mechanisms embodying the invention include first and second gear-pawl assemblies to selectively clamp (lock) the swivel ball and the housing relative to each other or unclamp (unlock) the swivel ball and the housing relative to each other. Rotational forces are selectively applied to the gear-pawl assemblies to cause vertical (up/down) motion which increases or decreases the pressure exerted between the housing and the swivel ball.

In accordance with the invention, a clamping mechanism for selectively locking or unlocking a swivel ball and a housing relative to each other includes a threaded compression screw secured to the housing such that it can rotate freely but cannot move vertically (relative to the housing and swivel ball) and first and second gear-pawl assemblies, located within the housing, between the housing and the swivel ball. The first gear-pawl assembly includes a first gear and the second gear-pawl assembly includes a second gear. Each one of the first and second gears has internal threads corresponding to the threads of the compression screw and is threaded onto the compression screw. The first and second gears have respective external teeth formed around their outer periphery for the application of rotational forces to the gears. Externally generated forces (e.g., buttons with their respective link arms) apply rotational forces to the first and second gears to selectively move apart from each other or towards each other along the compression screw. The lock/unlock mechanism may include push buttons, or any like control element, which can be operated (e.g., pushed, triggered or switched) with just one finger of a hand, to generate the external forces.

In a preferred embodiment, the first gear is keyed to the compression screw so they both turn and rotate together. Then, when external rotational forces are applied to the first gear, the compression screw is rotated and the second gear moves down along the compression screw increasing the spacing (i.e., distance) between the first and second gears. Increasing the spacing (distance) between the first and second gears causes increased pressure to be applied between the swivel ball and the housing tending to prevent motion (lock) between the swivel ball and the housing relative to each other. External rotational forces may be applied to the second gear to cause it to move up along the compression screw, thereby decreasing the spacing between the first and second gears. This, decreases the pressure between the swivel ball and the housing. The external forces can be applied until the swivel ball and the housing are unlocked and can move freely relative to each other. When the ball and housing are "unlocked", the housing may be rotated or swiveled to any desired position and then subsequently locked.

The clamping mechanism is "jamming" resistant when rotational forces to lock and unlock are simultaneously applied.

The clamping mechanism embodying the invention produces an improved mechanical advantage and greater clamping force than known prior art schemes.

The present invention is illustrated for, and in, a camera application to produce a novel and improved swivel ball head mount. However, it should be understood that the inventive clamping/gearing arrangement is suitable for other applications.

BRIEF DESCRIPTION OF THE DRAWINGS

In the accompanying drawings which are not drawn to scale, like reference characters denote like components, and.

DETAILED DESCRIPTION OF THE INVENTION

Figure 1A:
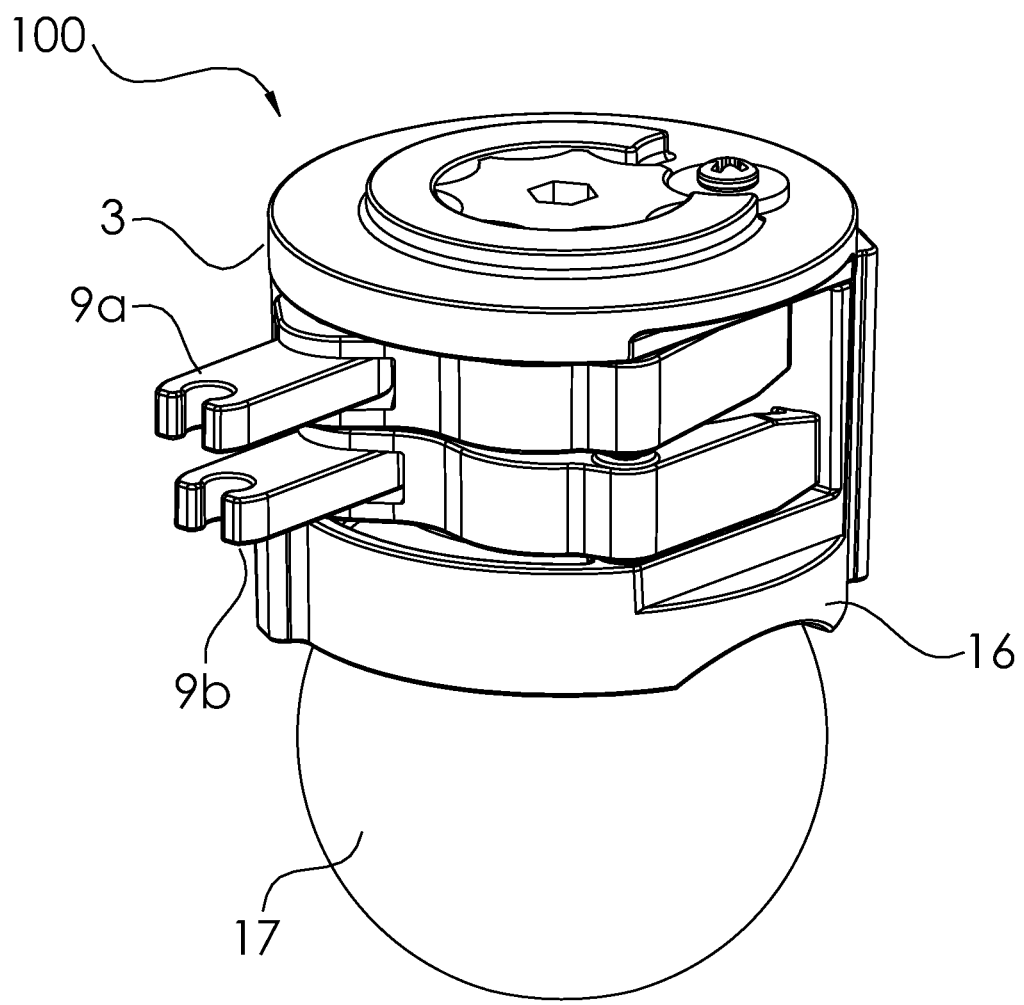
FIG. 1A is a highly simplified isometric line drawing of a clamping mechanism assembly 100 embodying the invention shown mounted on ball 17.
Figure 1B:
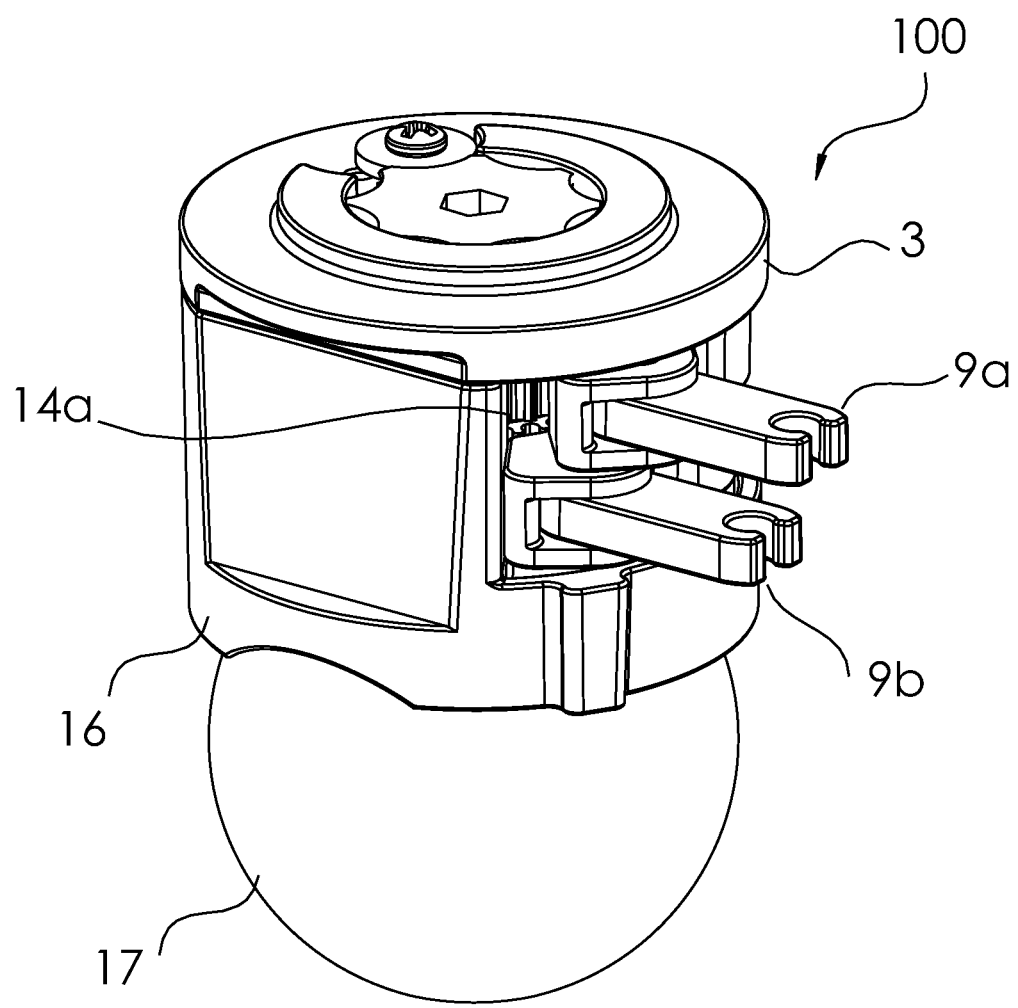
FIG. 1B is another highly simplified isometric view of a clamping mechanism assembly 100 embodying the invention mounted on ball 17.

FIGS. 1A and 1B show two different isometric views of a clamping (locking) mechanism 100, embodying the invention, mounted on a spherical ball 17.

Figure 2:
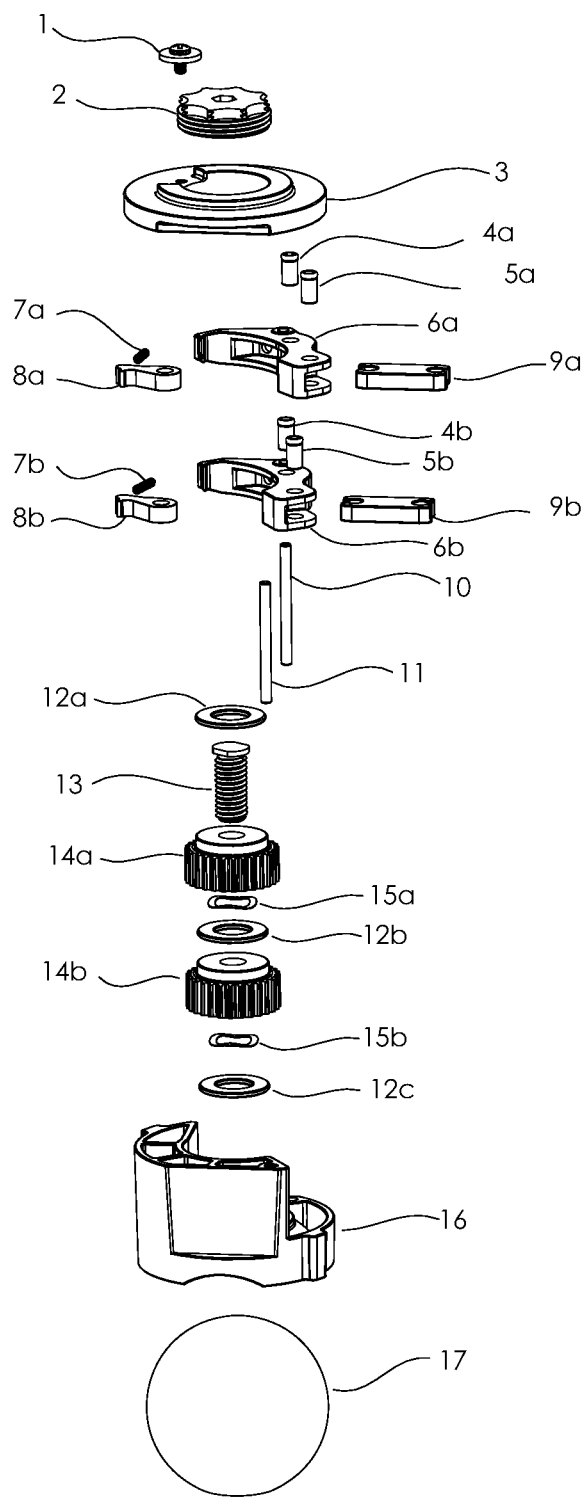
FIG. 2 is an exploded view of key components of a clamping mechanism embodying the invention.

FIG. 2 is an exploded view of key components forming the clamping mechanism 100. A brief description of the components is as follows:

(1). Screw and washer 1 are used to lock an adjustment nut 2 into a top cap 3.

(2) Adjustment Nut 2 is threaded into the top cap 3 and is used to fine tune a gap between a pressure cap 16 and the ball 17 during assembly.

(3) Top Cap 3 is fixed inside a housing 21 (see FIGS. 7A, 7B, 8A, 8B) with a retaining ring (801) to fix it from moving. Other retaining means could also be used.

(4) A pawl pivot pin 4a is a pin that a gear-pawl 8a rotates about and a pawl pivot pin 4b is a pin that a gear-pawl 8b rotates about.

(5) An actuation pin 5a enables the transfer of an input force from an actuation link 9a to a link arm 6a and an actuation pin 5b enables the transfer of an input force from an actuation link 9b to link arm 6b. As shown in the Figures (e.g., FIGS. 3, 4, 6), a button B1 is used to apply an input ("external") force to link 9a which activates link arm 6a and a button B2 is used to apply an input ("external") force to link 9b which activates link arm 6a.

(6) Link arm 6a pivots around link pivot pin 10 and is used to transfer the input force from actuation link 9a to gear-pawl 8a and link arm 6b pivots around the link pivot pin 10 and is used to transfer the input force from actuation link 9b to gear-pawl 8b.

(7) A pawl spring 7a pushes on the back of the gear pawl 8a to keep it in contact with gear 14a; and a pawl spring 7b pushes on the back of gear pawl 8b to keep it in contact with gear 14b.

(8) Gear pawl 8a is actuated by link arm 6a via pawl pivot pin 4a. Gear pawl 8a causes gear 14a to advance when its link arm 6a is actuated in response to the actuation of link 9a by an input (external) force applied to a button B1. Likewise, gear pawl 8b is actuated by link arm 6b via pawl pivot pin 4b. Gear pawl 8b causes gear 14b to advance when its link arm 6b is actuated in response to the actuation of link 9b by an input (external) force applied to a button B2.

(9) As already noted, actuation link 9a transfers an input (external) force from a button (e.g., B1) or other like device into link arm 6a and actuation link 9b transfers an input force from a button (e.g., B2) or other like device into link arm 6b.

(10) A link pivot pin 10 extends between top cap 3 and pressure cap "holder" 16. The link arms 6a and 6b pivot about pin 10.

(11) A stabilizer pin 11 is used to stabilize the assembly. It is connected at its top end to the top cap 3 and at its bottom end to the pressure cap holder 16.

(12) Thrust Washers (12a, 12b, 12c) are located at three locations. The top of gear 14a pushes against washer 12a which pushes against nut 2. Washer 12b is located between gears 14a and 14b. Washer 12c is located between the bottom of gear 14b and pressure cap 16. The washers function to transfer the force (pressure) from the pressure cap holder 16 to the gears, 14a and 14b, up to the adjustment nut 2. When gear 14a is actuated (rotated) and gear 14b moves down away from gear 14a pressure cap 16 pushes on ball 17, the force transfers from the pressure cap through 12c, screw 13 and gear 14a, washer 12a, and to adjustment nut 2. When gear 14b is actuated (rotated) and moves up along compression screw 13 towards gear 14a, the pressure on pressure cap 16 is decreased and when fully retracted gear 14b stops on washer 12b.

In the embodiments shown in the Figs., clamping module 100 is fixedly connected to the "main" housing 21 and gear 14a is fixedly connected to screw 13. When gear 14a and screw 13 are made to turn (rotate), gear 14b moves down along screw 13 and pushes down on washer 12c which then pushes down on the pressure cap 16 which pushes down on ball 17 tending to lock the clamping module and the "main" housing 21 preventing motion of the housing and the ball relative to each other. Washer 12b is intended for a spacer and a stop for when the gears are fully retracted. That is, when gear 14b is fully retracted, it stops on washer 12b.

(13) Compression Screw 13 is threaded into and locked against gear 14a and enables the assembly to expand and contract. Compression screw 13 is free to rotate (with gear 14a) but does not move up or down relative to the housing 21 and the swivel ball 17.

(14) Gears 14a and 14b have an internal thread which mesh with the thread of compression screw 13 and are threaded onto screw 13. In the embodiments of the invention shown here gear 14a is keyed to compression screw 13 and they rotate together. Gear 14a once mounted onto screw 13 does not go up and down. Gear 14b can move up and down along screw 13 and can also rotate. Gears 14a and 14b have external teeth formed along their outer periphery (and in a plane generally perpendicular to that of their internal threads). Gears 14a and 14b can rotate in response to rotation forces applied to their external teeth via their respective gear pawls 8a, 8b when their respective link arms 6a or 6b are actuated in response to input forces applied to their respective a actuation links (9a, 9b).

(15) Spring Washers 15a, 15b are optional. They may be used to keep pressure in the system for easy adjustment using the adjustment nut 2. They also enable the application of forces onto the thrust washers (12a, 12b, 12c) to maintain compression force between gears 14a and 14b.

Figure 6:
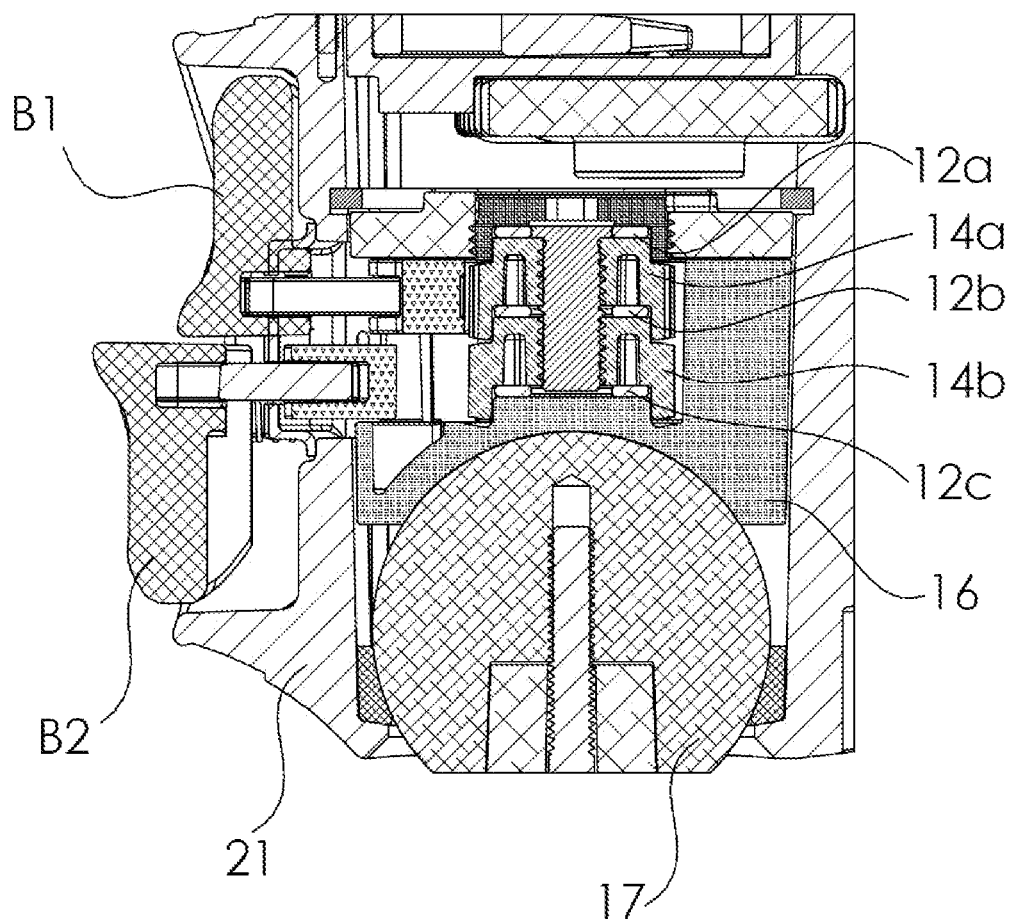
FIG. 6 is a simplified vertical cross sectional diagram of the locking assembly embodying the invention mounted between a housing and a swivel ball.

(16) Pressure Cap Holder 16 houses the internal components of the locking/unlocking mechanism 100 and is used to transfer the compression load from the gears 14a, 14b to the ball 17. As shown in FIG. 6, the pressure cap holder 16 is firmly attached to main housing 21. Thus, from FIGS. 3 and 6 it may be seen that when pressure is applied via module 100 between housing 21 and ball 17, the friction load between the housing 21 pressure cap 16 combination and ball 17 causes the components to lock together; i.e., it prevents motion between cap 16 and ball 17. The load is transferred through pressure cap 16, up through gears 14 to adjustment nut 2. Adjustment nut 2 is threaded into top cap 3 which transfers the load into the main housing 21 through retaining ring 801 (see FIG. 8a). When the compression assembly is actuated in a "locking" mode, pressure cap 16 pushes down on the ball 17, locking it against the housing 21, and preventing it from moving.

(17) Ball joint 17 is a ball that is typically used for a camera ball mount. Ball 17 may be, for example, supported by or mounted on a separate base 171.

In the present embodiments the operation of the compression assembly is controlled by push buttons (e.g., B1 and B2). The buttons are spring loaded (see FIG. 8B) so they can be pushed in to actuate the assembly and then spring back. Button B1 when depressed tends to cause clamping/locking (increases pressure to prevent relative motion between the housing 21 and the ball 17) and button B2 when depressed tends to cause a decrease in pressure between the housing 21 and ball 17 easing relative motion between the housing 21 and ball 17. As described below, a feature of the invention is that if buttons B1 and B2 are activated at the same time, there is no change in the relative pressure between the housing and the ball. This feature prevents the occurrence of "jamming". Note, that other known actuating mechanisms or switches may be used to practice the invention.

Referring to the Figures, a description of the operation of the clamping mechanism 100 follows:

Housing 21 may be locked (via pressure cap holder 16) to ball joint 17. With pressure cap 16 locked into place within a housing 21 (see FIGS. 6, 7A, 7B, 8A and 8B), pressure cap 16 and housing 21 can be clamped (locked) to ball joint 17 by operation of the clamping mechanism 100, as follows. A user can push spring loaded retractable button B1 which then pushes link 9a which then causes link arm 6a to be actuated. Link arm 6a then pushes gear pawl 8a against gear 14a and causes gear 14a to rotate at least one notch. In this embodiment, gear 14a is advanced in a counter clockwise direction when viewed from the top. This turns the compression screw 13, which is locked to gear 14a, in a counter clockwise direction relative to gear 14b, which has a female thread. As a result, the internal assembly expands in that gears 14a and 14b are forced to separate and undergo greater distancing. This applies pressure to the ball 17 since gear 14a is fixed at its top end (see FIGS. 2, 3, 8A, 8b) and gear 14b is forced to move down applying increasing an increasing downward pressure on pressure cap 16. Button B1 can be pushed repeatedly until gears 14a and 14b expand and the spacing between them increases to the point that housing 21 and ball 17 cannot move relative to each other. They then are clamped or locked to each other. (Note the choice of rotation is arbitrary and the gears and screw 13 could be made to rotate in the opposite, clockwise, direction).

Regarding the clamping mechanism note when the screw 13 rotates/turns (in response to the top gear 14a being caused to rotate by its corresponding-button pawl action) the bottom gear 14b moves downwards (rides vertically down) along the screw because it is prevented from rotating by the longer pawl. This causes the distance (spacing) between the two gears to increase and apply increasing pressure between housing and ball until locking occurs. When the screw 13 rotates/turns (in response to the top gear being caused to rotate by its corresponding button pawl action), the bottom gear moves vertically down (note that the bottom gear does not rotate for this condition). This causes the distance between the two gears to increase and apply increasing pressure between housing and ball until locking occurs.

The cross section stack up (see FIGS. 3 and 6) shows the load path when the assembly is expanded. Starting at the bottom, the pressure cap housing 16 is pushing against the ball. The top of the pressure cap housing 16 is pushing against the thrust washer 12c and spring washer 15b, which then transfers to the gear 14b, then through the compression screw 13. Since the compression screw is locked into gear 14a, the load is then transferred through gear 14a and the top thrust washer 12a, into adjustment nut 2. The adjustment nut then transfers the load into the top cap which is fixed in housing 21.

The housing 21 and ball 17 can be unlocked (unclamped) as follows. A user can push button B2 which then pushes link 9b which then causes link arm 6b to be actuated. When link arm 6b is actuated it pushes the lower gear pawl 8b (see FIG. 2) against gear 14b. Gear 14b is then advanced, towards gear 14a, in a counter clockwise direction when viewed from the top. When gear 14b is advanced, the assembly contracts and relieves pressure from the ball 17 (see FIGS. 2 and 3).

If a user pushes both link arms, 6a and 6b, at the same time, both gears will advance at the same time and neither expansion nor contraction of the assembly occurs. Thus inadvertent jamming is prevented.

Figure 4:
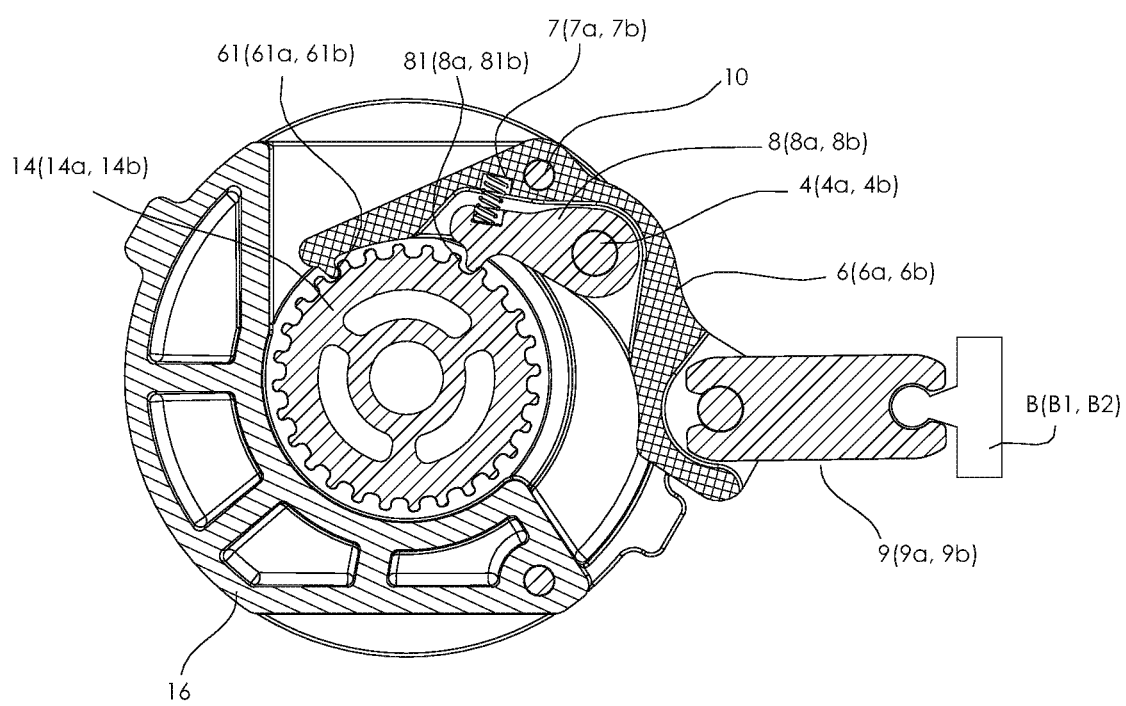
FIG. 4 is a simplified horizontal cross sectional diagram of a gear and pawl assembly which may be used in a clamping mechanism embodying the invention.
Figure 4A:
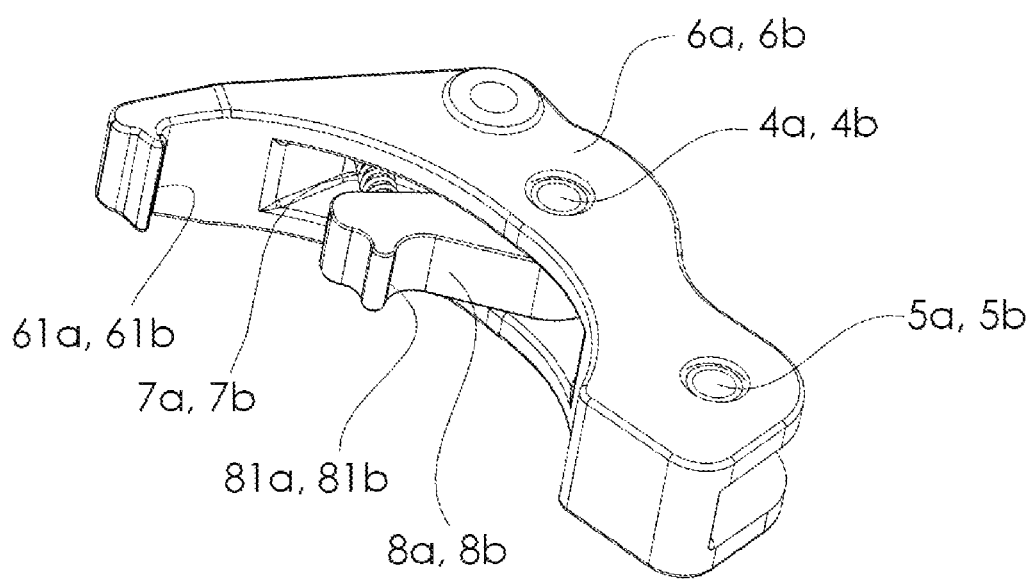
FIG. 4A is a simplified isometric diagram of a pawl assembly used to practice the invention.
Figure 5:
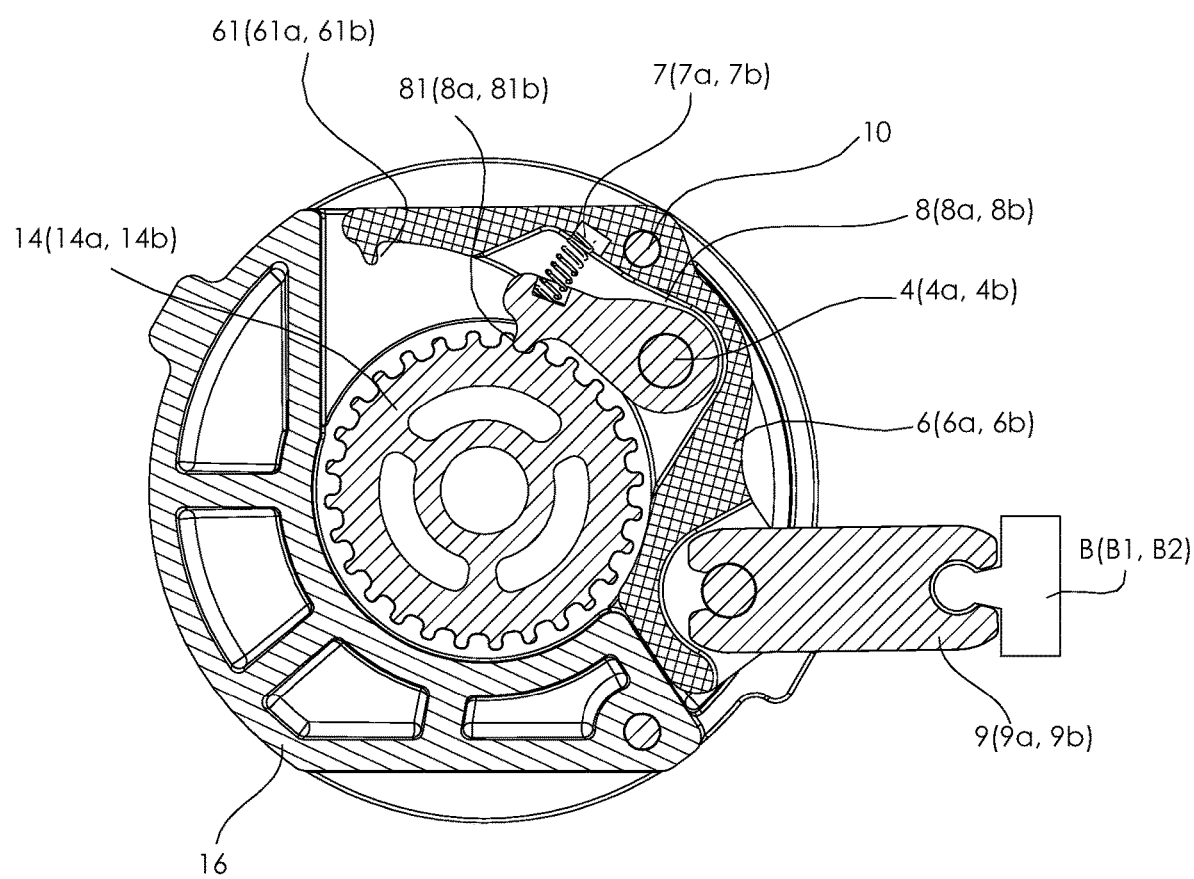
FIG. 5 is another view of the simplified horizontal cross sectional diagram of the gear and pawl assembly of the clamping assembly embodying the invention.

The operation of the locking mechanism may be further explained with reference to FIGS. 4, 4A and 5. FIG. 4 illustrates the operation of the gear-pawl rotating mechanism when no input force is applied (i.e., buttons B1 or B2 are not pushed). FIG. 4A is an isometric drawing showing the gear pawl assembly. FIG. 5 illustrates the operation of the gear-pawl rotating mechanism when an input force is applied (i.e., buttons B1 or B2 is pushed in).

FIG. 4 is a top cross sectional view of the gear-pawl assembly taken along a horizontal slice showing how the gear pawl 8 (8a or 8b) and the link arm 6 (6a or 6b) and the actuation link 9 (9a or 9b) when the link arm 6 is not activated ("actuated") by the application of an input force via button B1 or B2) to actuation link 9 (9a or 9b). The spring 7 (7a or 7b) forces and holds the gear pawl 8 into the gear 14 (14a or 14b) to positively engage the tooth (and teeth) of gear 14. The contact surface 81 on the pawl gear is what contacts the gear teeth on gear 14. (Both the top gear 14a and the bottom gear 14b have a gear pawl 8 and link arm 6 to rotate the gear.) Contact surface 61 on the link arm 6 (6a or 6b) engages the gear to prevent rotation of the gear when the link arm 6 is not activated.

For example, if the user actuates link arm 6a, this will rotate gear 14a and advance the gear one tooth forward. During this action, the contact surface 61 on link arm 6b prevents the gear 14b from also rotating. This is what allows the gears 14a and 14b to rotate relative to each other, thus causing the assembly to expand. When the opposite action occurs and link arm 6b is actuated, the contact surface 61 on link arm 6a prevents the gear 14a from rotating and thus causing the assembly to contract. The spring 7 forces the gear pawl 8 into the gear 14 to positively engage the tooth of gear 14.

FIG. 5 shows the position of the components when the link arm 6 is actuated. When a button (B1 or B2) is pushed an input force is applied to actuation link 9 (9a or 9b) it causes link 6 (6a or 6b) to pivot up so that the contact surface 61 (61a, 61b) is no longer in contact with gear 14 (14a, or 14b). At the same time, gear pawl 8 (8a or 8b) applies pressure to gear 14 (14a or 14b) at contact surface 81 (81a, 81b). This allows the gear to rotate as the gear pawl 8 contacts the gear at surface 81, which then advances the gear 14 counter clockwise.

When the actuation link 9 (9a or 9b) is pulled back (or pushed back by springs 810 see FIG. 8B), the gear pawl 8 slides back over the gear tooth on 14, then the system is reset to the state shown in FIG. 4.

Figure 3:
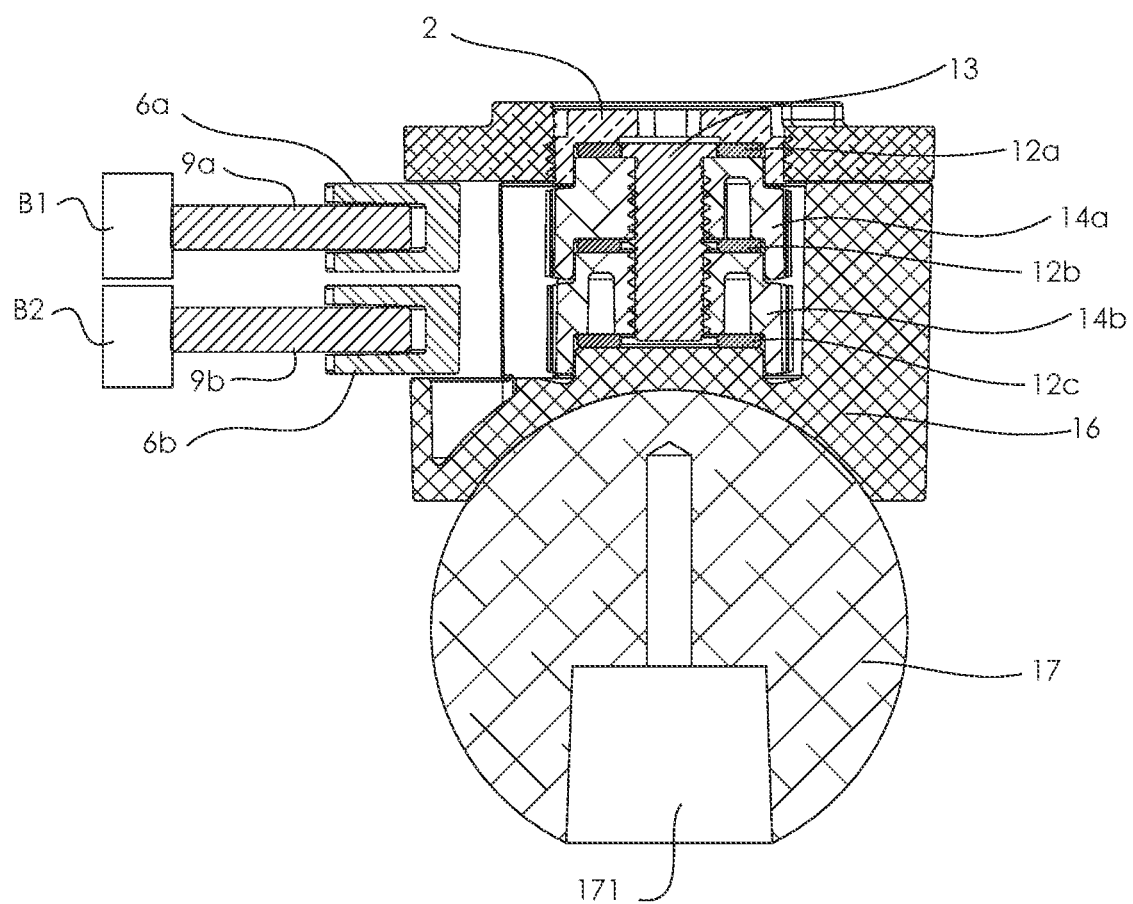
FIG. 3 is a simplified vertical cross sectional diagram of a clamping mechanism embodying the invention mounted on a swivel ball.

FIG. 6 shows a similar cross section to that of FIG. 3 with the assembly installed in a housing.

Figure 7A:
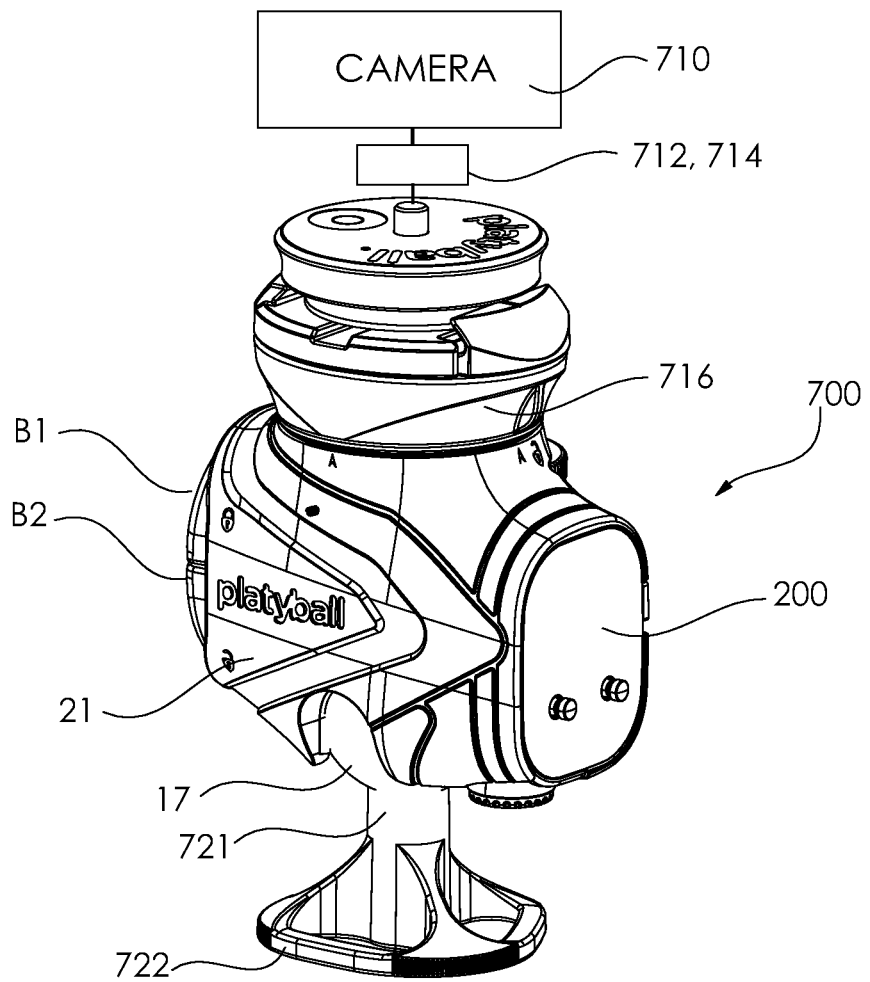
FIG. 7A and FIG. 7B are isometric representative drawings of two different views of a swivel ball head mount incorporating the clamping mechanism embodying the invention intended to be coupled to, and support, a camera.
Figure 7B:
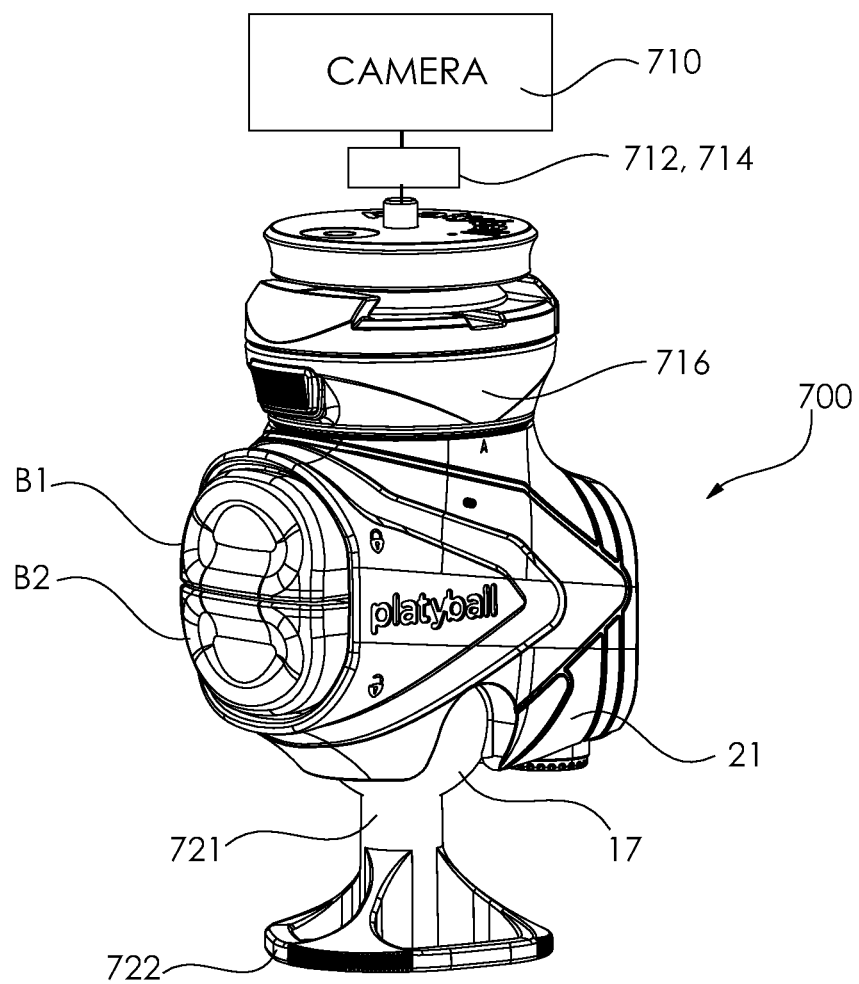

Referring to FIGS. 7A-7B there is shown a swivel ball head mount 700 which includes a housing 21 and a spherical swivel ball 17. The swivel ball head mount 700 is intended to provide support for a camera system 710 and to enable the camera 710 to be rotated and tilted. In the embodiment shown in FIGS. 7A-7B, spherical swivel ball 17, which may be of plastic or metal, is mounted on a stem 721 which rests on a base plate 722. The ball 17, the stem 721 and the base plate 722 may be formed as a single unit or as separate components which are then combined. Swivel ball 17 allows users to position the housing, and any camera mounted on the housing, to any selected position. Pedestal 721 and base plate 722 provide support for ball head 17 and enable a user to mount the assembly 700 to a tripod or to any suitable device. In the discussion to follow and in the appended claims the term "ball" or "ball joint" refers to a component such as spherical swivel ball 17 shown in these figures.

The housing 21 has an opening adapted to receive ball 17 which extends within the interior of housing 21. In the embodiment shown in these figures the housing 21 overlies the ball 17 and is mounted so it can swivel about ball 17. The housing 21 and ball 17 are mechanically coupled to each other such that the housing can be rotated and tilted (swiveled) about the ball head 17 to any desired position and then locked (clamped) in the desired position by means of the novel clamping mechanism operated by a lock button B1 which can be operated with one finger pushing on the lock button. The housing 21 can be released (unlocked or unclamped) by operating the novel clamping mechanism via a release (unlock) button B2 which can also be operated with one finger pushing on the release button. In the discussion above and to follow the term "housing" refers to a part containing ("housing") components of the type shown in the Figures and the term "clamping mechanism" refers to components generally contained within the housing and which are coupled between the ball 17 and the housing 21 to control the clamping (locking) together of the ball and housing or their release so they are free to rotate relative to each other.

In FIGS. 7A and 7B a rotatable panning mechanism 716 is mounted on top of the housing 21 and is secured thereto. A camera 710 can be mounted on top of panning mechanism 716 and secured thereto via a base plate 712 and a clamp 714 connected to the panning mechanism 716 which is attached to the top of the housing 21. Panning mechanism 716, located between the camera 710 and the housing 21, enables the camera to be set at a fixed viewing angle and to then be rotated 360 degrees relative to the housing 21.

Referring to FIGS. 7A, 7B there is shown a push button B1 which, when pushed, functions to control the clamping mechanism to selectively, gradually, and controllably tighten and lock the housing 21 to the ball 17 and a push button B2 which, when pushed, functions to control the clamping mechanism to selectively, gradually, and controllably release and unlock housing 21 relative to the ball 17. Push buttons B1 and B2 extend along an outer surface of housing 21. They are designed to provide a relatively smooth contour to the outer surface of housing 21. This is in contrast to protruding control knobs present in the prior art. Note that buttons B1 and B2 are respectively coupled to actuation links 9a and 9b.

Figure 8A:
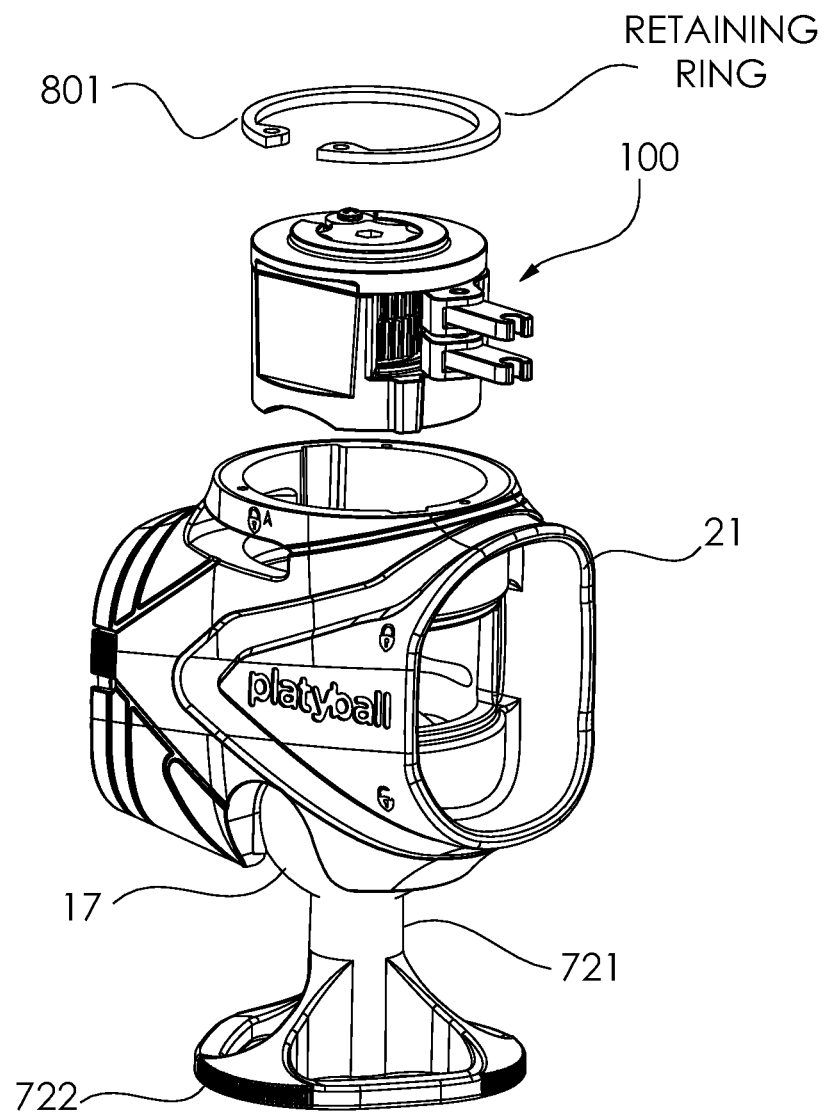
FIG. 8A is an exploded isometric view representation of a clamping mechanism embodying the invention to be mounted within a housing overlying a swivel ball.
Figure 8B:
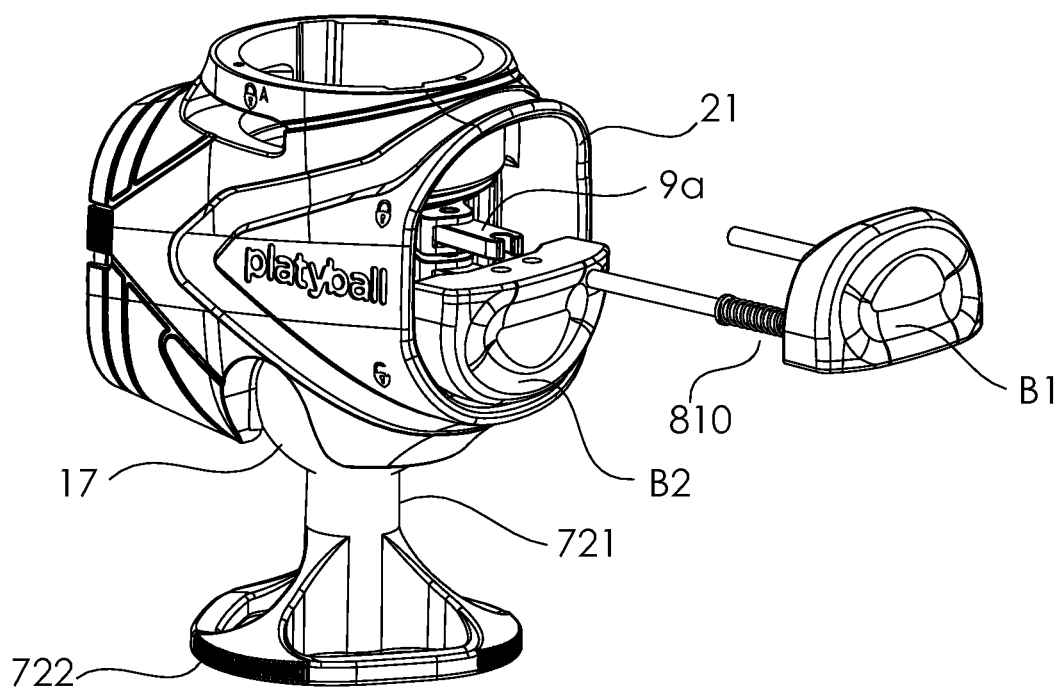
FIG. 8B is an exploded isometric representation showing buttons for applying "external" forces to a clamping mechanism embodying the invention mounted within a housing overlying a swivel ball.

FIGS. 8A and 86 serve to show that clamping mechanism 100 is mounted within housing 21 and that a retaining ring 801 is installed on top of assembly 100 to hold it in place with housing 21 and prevent it from moving in the vertical direction. Clamping mechanism 100 with its pressure cap housing is fixedly held in place so it cannot rotate, move up and in the vertical direction or to the side. Clamping mechanism 100 is a modular assembly which is designed to be easily placed within the housing 21 between the ball 17 and the housing 21 and then fixedly connected to the housing.

A recapitulation of the embodiment illustrating the invention shown in the Figures is as follows:

1—The upper (top) gear 14a is keyed to the screw 13 and they both rotate together in a horizontal plane when the gear pawl is activated by its corresponding button, B1. There is no vertical motion of the screw 13 and top gear 14a relative to the housing 21 (or ball 17).

2—The upper gear 14a may have an internal thread to mount it on the screw 13; but once in place there is no relative motion between the top gear and the screw.

3—The bottom gear 14b has an internal thread to mesh with the screw thread.

4—When the screw 13 rotates/turns (in response to the top gear being caused to rotate by its corresponding-button pawl action) the bottom gear 14b moves downwards (rides vertically down) along the screw because it is held in place by the longer pawl. This causes the distance between the two gears to increase and apply increasing pressure between housing and ball until locking occurs. When the screw rotates/turns (in response to the top gear being caused to rotate by its corresponding button pawl action), the bottom gear moves vertically down (note that the bottom gear does not rotate during this action). This causes the distance between the two gears to increase and apply increasing pressure between housing and ball until locking occurs.

5—When the button pawl action corresponding to the bottom gear causes it to turn, the bottom gear rotates upwardly (rides vertically up) along the screw. This causes the distance between the two gears to decrease and apply decreasing pressure between housing and ball to unlock them and allow full movement.

6—The design of the threading is such that when the top and bottom gears are being caused to rotate simultaneously there is essentially no vertical motion between them—as a result if the two buttons controlling the movement of the gears are simultaneously depressed there is no "jamming" and the relationship of the housing and ball does not change.

7—Rotation of both gears is always in the same direction

8—The initial condition of the system is when the two gears are the closest to each other.

It has thus been shown that the present invention relates to a clamping mechanism mounted within a housing, between the housing and a swivel ball, where the clamping mechanism can "lock" the housing and swivel ball to prevent relative motion between the housing and ball, or "unlock" the housing from the swivel ball to allow unhindered rotation between the housing and the ball.

As used herein, and in the accompanying claims, when referring to a housing overlying a swivel ball, (a) the housing may be mounted or coupled to the ball such that the housing can feely rotate about the ball without the ball moving (i.e., the ball can be held fixed); or (b) the ball can freely rotate in the housing (i.e., the housing can be held fixed).

Two gears with internal threads are mounted on a compression screw. The two gears have external teeth which are responsive to rotational input forces which can cause the two gears to move apart from each other or closer to each other along the screw. This movement of the gears is used to increase or decrease pressure enabling the locking and unlocking of selected components.

What is claimed is:

1. A clamping mechanism for selectively locking or unlocking a swivel ball relative to a housing overlying said swivel ball, said clamping mechanism comprising:

a threaded compression screw, and first and second gears located within the housing between the housing and the swivel ball;

each one of said first and second gears having internal threads corresponding to the threads of the compression screw and said gears being threaded onto the compression screw; and said first and second gears having respective external teeth for the application of rotational forces to the gears; and means for selectively applying rotational forces to the first and second gears for causing the gears to selectively move apart from each other or towards each other along the compression screw; and means responsive to the movement of the gears for either increasing pressure applied between the swivel ball and the housing for impeding movement of the swivel ball relative to the housing, or decreasing pressure applied between the swivel ball and the housing for easing movement of the swivel ball relative to the housing.

2. A clamping mechanism as claimed in claim 1, wherein said first gear is keyed to the compression screw so they both turn and rotate together when a rotational force is applied to the first gear; and wherein, when the compression screw is rotated the second gear moves down along the compression screw increasing the distance between the first and second gear.

3. A clamping mechanism as claimed in claim 2, wherein said means for selectively applying rotational forces to the first and second gears includes push-buttons located along said housing coupled to said gears via link arms and gear-pawls.

4. A clamping mechanism as claimed in claim 3, wherein said gear-pawls prevent rotational movement of one of said first and second gears in the absence of a rotational force being applied to that gear.

5. A clamping mechanism as claimed in claim 1, wherein said means for selectively applying rotational forces to the first and second gears includes a first gear pawl assembly coupled to said first gear and a second gear pawl assembly coupled to said second gear.

6. A clamping mechanism as claimed in claim 5, wherein said first gear pawl assembly is coupled to a first button adapted to receive a first activating input force for causing the first gear to rotate, and wherein said second gear pawl assembly is coupled to a second button adapted to receive a second activating input force for causing the second gear to rotate, and wherein said first gear pawl assembly blocks the rotation of said first gear when there is no first activating input force and wherein said second gear pawl assembly blocks the rotation of said second gear when there is no second activating input force.

7. A clamping mechanism as claimed in claim 6, wherein, in response to said first activating input force, said first gear is caused to rotate and the second gear moves down the compression screw, in a direction away from the first gear; and wherein, wherein, in response to said second activating input force, said second gear is caused to rotate moving up along the threaded compression screw, in a direction closer to the first gear.

8. A clamping mechanism as, claimed in claim 1, wherein said means responsive to the movement of the gears includes at least one pressure cap and at least one washer stacked with the first and second gears between the housing and the swivel ball.

9. A clamping mechanism as claimed in claim 1, wherein said means responsive to the movement of the gears includes a washer stacked above the first gear, a second washer stacked between the first and second gears and a pressure cap stacked between the second gear and the swivel ball.

10. The clamping mechanism as claimed in claim 1, wherein said means for selectively applying rotational forces to the first and second gears includes first and second gear pawl assemblies coupled to said first and second gears and wherein said means responsive to the movement of the gears includes at least one washer and a pressure cap.

11. The clamping mechanism as claimed in claim 10, wherein said means for selectively applying rotational forces and said means responsive to the movement of the gears and said compression screw and said first and second gears are incorporated in a module disposed between the housing and the swivel ball.

12. The clamping mechanism as claimed in claim 11, wherein buttons are disposed along the housing and said buttons are coupled via the first and second gear pawl assemblies to the first and second gears to control their movement and the forces applied between the swivel ball and the housing to control their relative motion.

13. A clamping mechanism as claimed in claim 1, wherein the means for selectively applying rotational forces to the first and second gears includes a first button coupled via a first gear-pawl assembly to said first gear and a second button coupled via a second gear-pawl assembly to said second gear; wherein when said first button is activated the first gear rotates and the second gear moves down along the screw, away from the first gear, when the second button is activated the second gear moves up the screw towards the first gear; and wherein when the first and second button are activated at the same time, the first and second gears remain at the same distance relative to each other.

14. A clamping mechanism for selectively locking or unlocking a swivel ball relative to a housing overlying said swivel ball, said clamping mechanism comprising:
a threaded compression screw, and first and second gears located within the housing between the housing and the swivel ball;
each one of said first and second gears having internal threads corresponding to the threads of the compression screw and said gears being threaded onto the compression screw; and said first and second gears having respective external teeth for the application of rotational forces to the gears; and
means for selectively applying rotational forces to the first and second gears for: (a) causing the gears to move apart from each along the compression screw for impeding movement of the housing relative to the swivel ball; or (b) causing the gears to move towards each other along the compression screw for easing movement of the swivel ball relative to the housing.

15. A combination comprising:
a swivel ball;
a housing overlying said swivel ball;
a clamping mechanism coupled between said swivel ball and said housing, for selectively locking or unlocking said swivel ball relative to said housing, said clamping mechanism including:
a threaded compression screw, and first and second gears located within the housing between the housing and the swivel ball; with each one of said first and second gears having internal threads corresponding to the threads of the compression screw and said gears being threaded onto the compression screw; and said first and second gears having respective external teeth for the application of rotational forces to the gears; and
means for selectively applying rotational forces to the first and second gears for: (a) causing the gears to move apart from each along the compression screw for impeding movement of the housing relative to the swivel ball; or (b) causing the gears to move towards each other along the compression screw for easing movement of the swivel ball relative to the housing.

16. The combination as claimed in claim 15 further including a panning mechanism mounted on said housing.

17. The combination as claimed in claim 16 further including a camera mounted on said housing.

* * * * *